US010107208B2

(12) United States Patent
Gerow et al.

(10) Patent No.: US 10,107,208 B2
(45) Date of Patent: Oct. 23, 2018

(54) SYSTEM AND METHOD TO OPERATE AN ENGINE

(71) Applicant: Ford Global Technologies, LLC, Dearborn, MI (US)

(72) Inventors: Matthew Gerow, Alpena, MI (US); John Eric Rollinger, Troy, MI (US); Adam J. Richards, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 15/397,564

(22) Filed: Jan. 3, 2017

(65) Prior Publication Data

US 2018/0187611 A1 Jul. 5, 2018

(51) Int. Cl.
| | | |
|---|---|---|
| *F02D 13/06* | (2006.01) | |
| *F02D 13/02* | (2006.01) | |
| *F01L 1/047* | (2006.01) | |
| *F01L 1/34* | (2006.01) | |
| *F02D 41/00* | (2006.01) | |
| *B60R 16/023* | (2006.01) | |
| *F01L 13/00* | (2006.01) | |

(52) U.S. Cl.
CPC ...... *F02D 13/0234* (2013.01); *B60R 16/0236* (2013.01); *F01L 1/047* (2013.01); *F01L 1/34* (2013.01); *F02D 13/06* (2013.01); *F02D 41/0087* (2013.01); *F01L 2013/001* (2013.01); *F01L 2013/115* (2013.01); *F01L 2820/043* (2013.01); *F02D 13/0238* (2013.01); *F02D 2200/0406* (2013.01)

(58) Field of Classification Search
CPC ......... F01L 1/047; F01L 1/34; F01L 13/0005; F01L 2013/001; F01L 2013/115; F01L 2820/043; F02D 13/0234; F02D 13/0238; F02D 13/06; F02D 41/0087; F02D 2200/0406
USPC ...................................... 123/90.15
See application file for complete search history.

(56) References Cited

U.S. PATENT DOCUMENTS

| | | | |
|---|---|---|---|
| 6,237,559 B1 * | 5/2001 | Russ | ..... F01L 1/2405 123/198 F |
| 7,555,896 B2 | 7/2009 | Lewis et al. | |
| 2013/0066502 A1 | 3/2013 | Yuille et al. | |
| 2013/0255626 A1 | 10/2013 | Serrano | |
| 2016/0146120 A1 | 5/2016 | Kawaguchi | |

* cited by examiner

*Primary Examiner* — Jorge Leon, Jr.
(74) *Attorney, Agent, or Firm* — Julia Voutyras; McCoy Russell LLP

(57) ABSTRACT

Systems and methods for controlling operation of deactivated engine cylinders are presented. In one example, intake valve timing of deactivated engine cylinders is advanced to reduce amplitudes of intake pressure pulsations while exhaust valves of the deactivated engine cylinders are held closed. Further, intake valve timing of deactivated cylinders may be advanced responsive to output of an intake manifold pressure sensor.

20 Claims, 4 Drawing Sheets

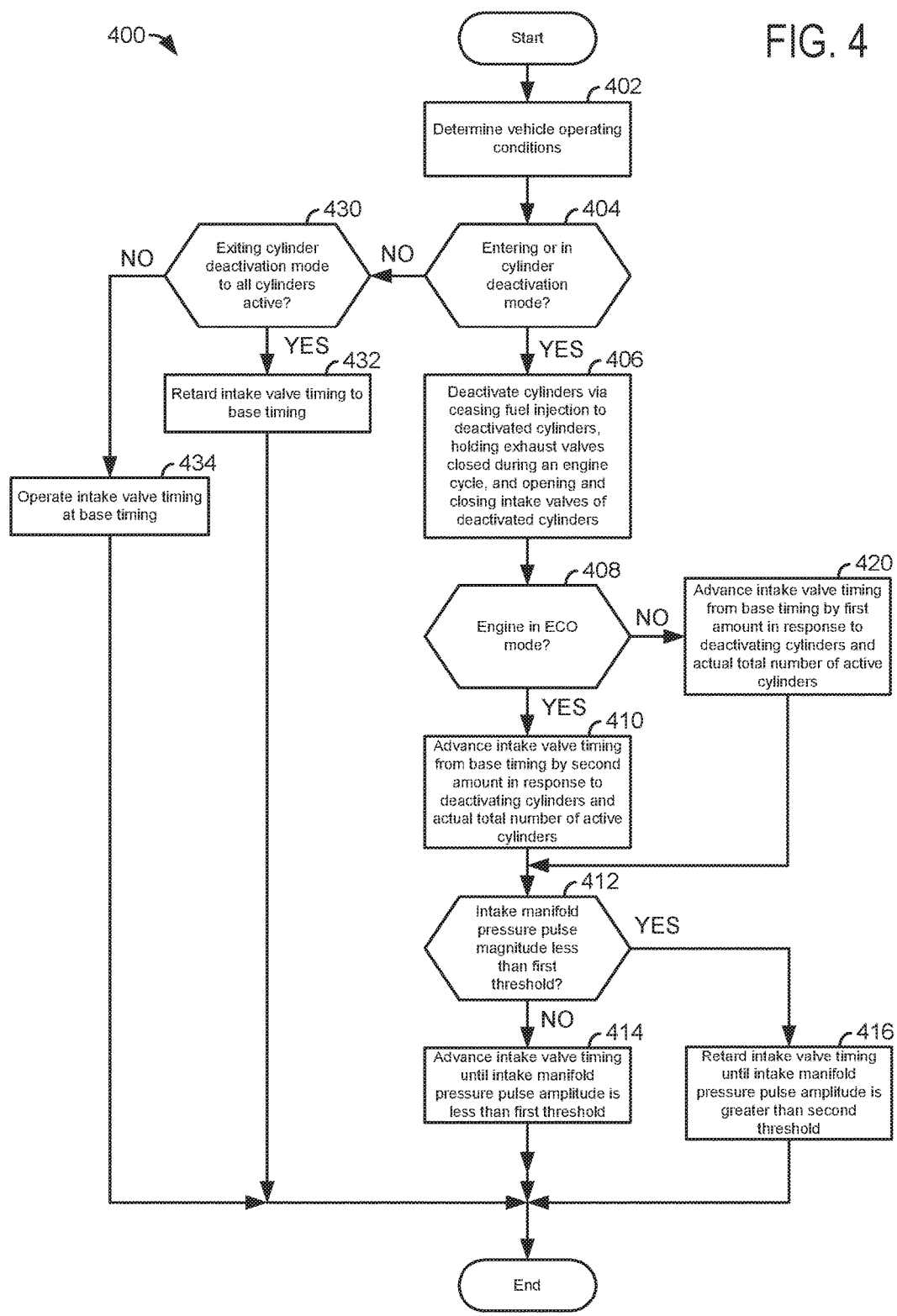

SYSTEM AND METHOD TO OPERATE AN ENGINE

FIELD

The present description relates to a system and methods for improving operation of an engine that includes cylinders that may be selectively activated and deactivated to conserve fuel while meeting engine torque demands. The system and methods may be applied to an engine that deactivates engine cylinders by deactivating exhaust valves and operating intake valves of deactivated cylinders.

BACKGROUND AND SUMMARY

An engine cylinder may be deactivated by ceasing combustion in the engine cylinder. Combustion in the cylinder may be ceased by stopping fuel from entering the cylinder. Further, if the engine is a spark ignited engine, spark supplied to deactivated cylinders may also be ceased. If intake valves and exhaust valves of deactivated cylinders continue to operate while combustion is ceased in deactivated cylinders, oxygen may be pumped from the engine intake manifold to an exhaust gas after treatment system. Performance of the exhaust gas after treatment system may degrade if excess oxygen is pumped to the exhaust gas after treatment system. Therefore, it may be desirable to stop air flow through deactivated cylinders while the engine continues to rotate. One way to stop air flow through deactivated engine cylinders is to hold intake and exhaust valves of deactivated cylinders in closed positions while the engine continues to rotate. However, cost of manufacturing such an engine may be prohibitive if all engine cylinders may be deactivated in this way.

The inventors herein have recognized the above-mentioned issues and have developed an engine method, comprising: holding exhaust valves of a cylinder of an engine closed and operating intake valves of the cylinder while rotating the engine through an engine cycle; and advancing intake valve timing of the cylinder at an engine speed and torque beyond a base intake valve timing of the cylinder at the engine speed and torque while rotating the engine through the engine cycle.

By holding exhaust valves closed and operating intake valves while an engine rotates, it may be possible to provide the technical result of selectively deactivate one or more cylinders of the engine without pumping oxygen to an exhaust gas after treatment system and without having to include deactivating intake valves. Thus, system cost may be reduced. In addition, advancing intake valve timing while exhaust valves are held closed during an engine cycle may reduce an amplitude of intake manifold pressure pulsations. Reducing intake manifold pressure pulsations may reduce engine noise, vibration, and harshness. Further, engine volumetric efficiency may be increased via advancing intake valve timing so that efficiency of active cylinders may be increased while one or more engine cylinders are deactivated.

The present description may provide several advantages. Specifically, the approach may reduce engine noise and vibration. Further, the approach may advance or retard intake valve timing of deactivated cylinders without air flowing through the deactivated cylinders during an engine cycle in response to amplitudes of engine intake manifold pressure pulsations to improve intake valve timing control. Further still, the approach may advance intake valve timing in response to an actual total number of active cylinders while at least one engine cylinder is deactivated to further improve engine operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 4 shows a flow chart of an example method for operating an engine.

DETAILED DESCRIPTION

Figure 1:
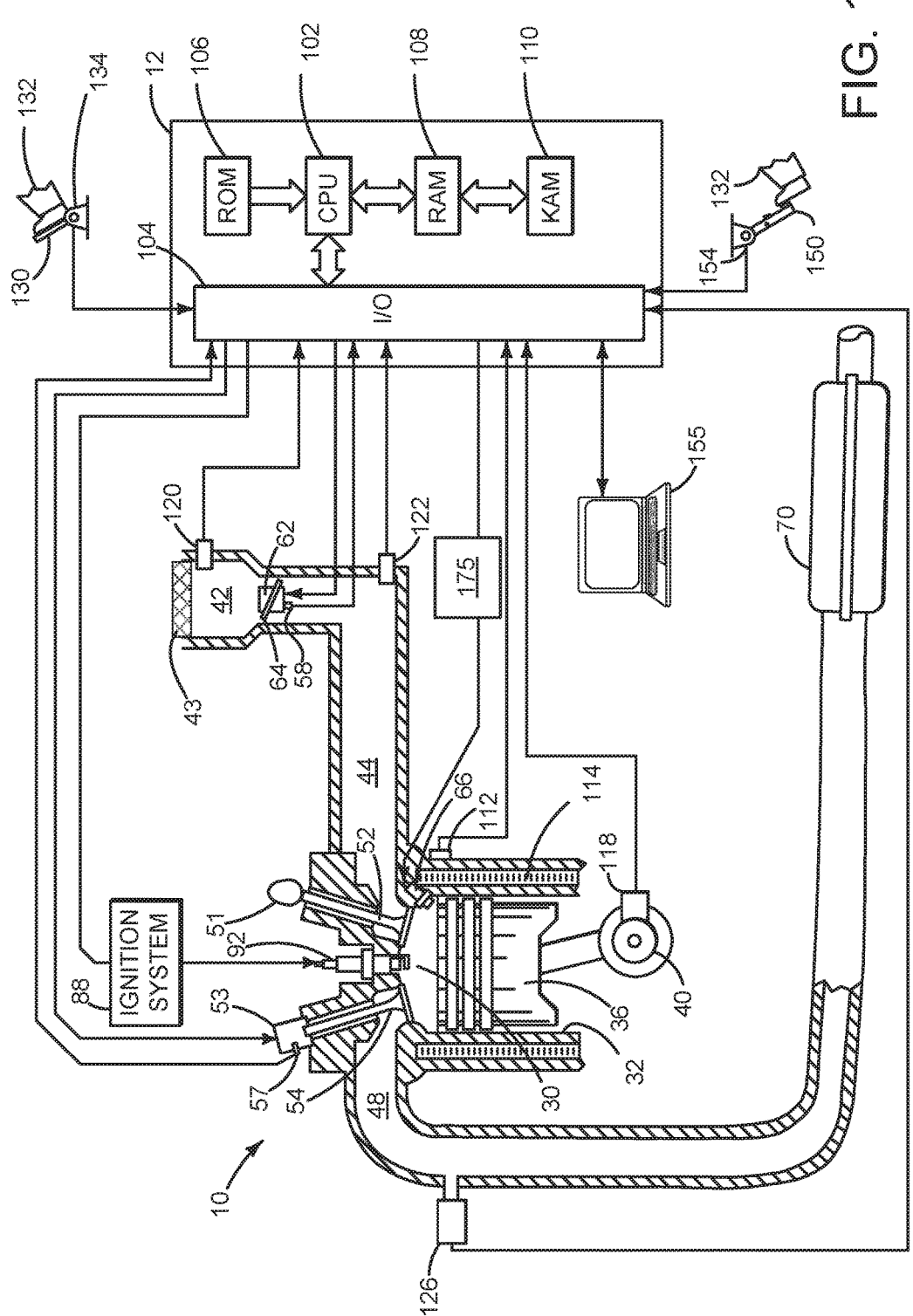
FIG. 1 is a schematic diagram of an engine.
Figure 2A:
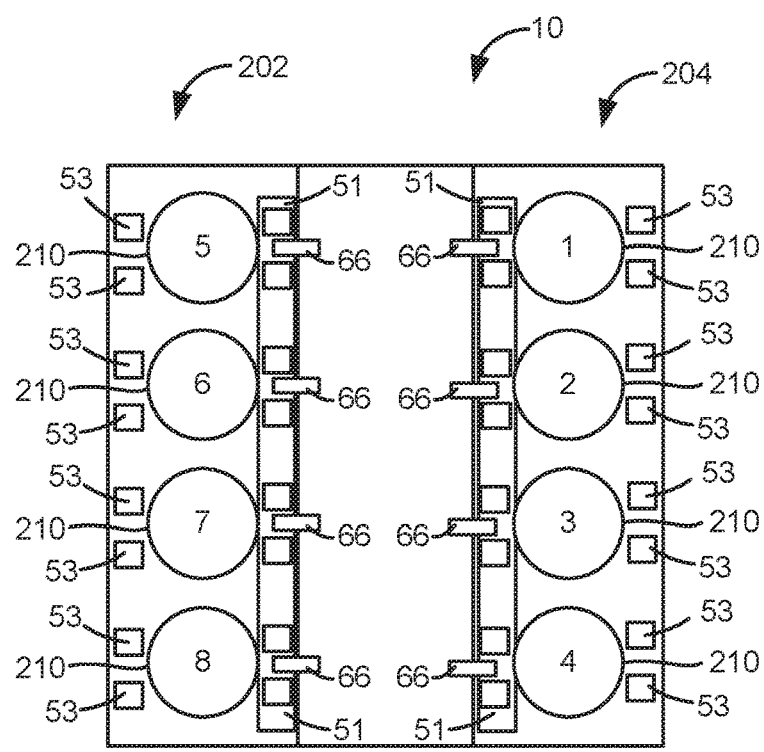
FIG. 2A is a schematic diagram of an eight cylinder engine with two cylinder banks.
Figure 2B:
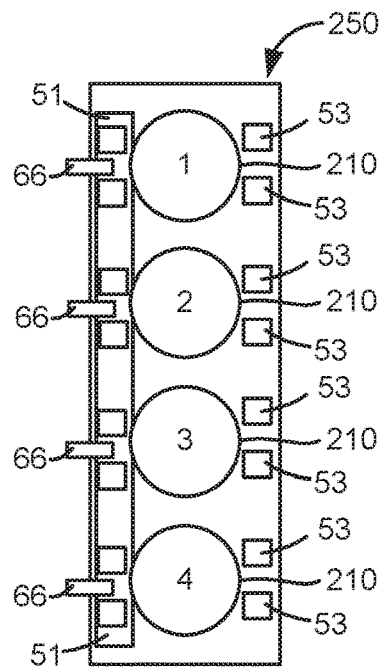
FIG. 2B is a schematic diagram of a four cylinder engine with a single cylinder bank.
Figure 3A:
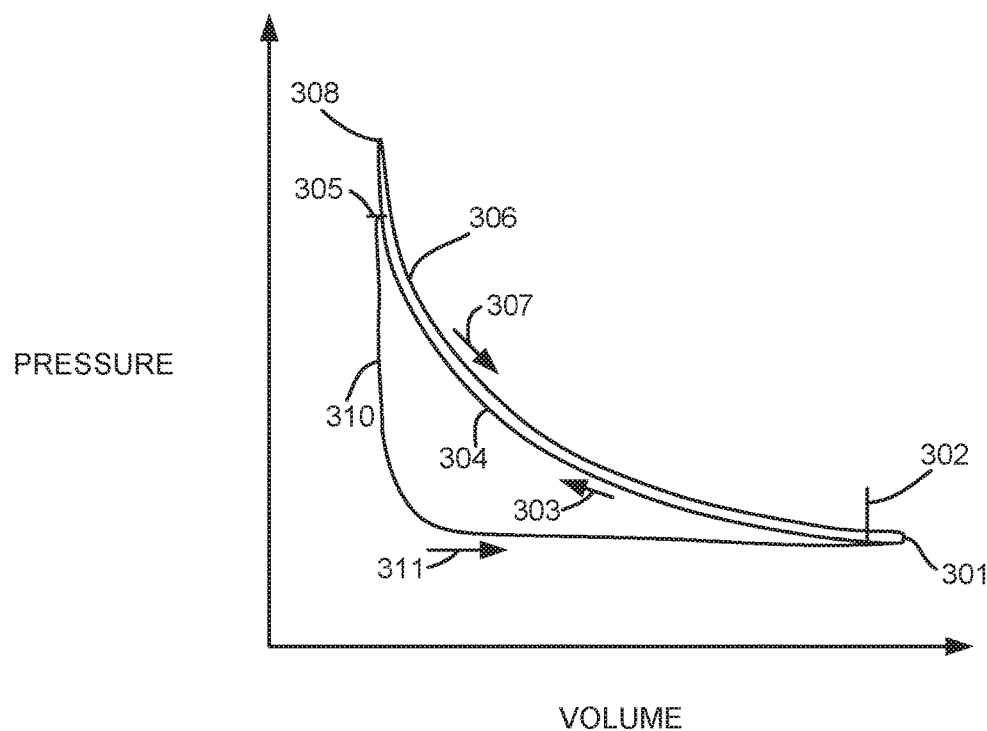
FIG. 3A is plot showing an exemplary cylinder pumping cycle for a deactivated cylinder with base intake valve timing.
Figure 3B:
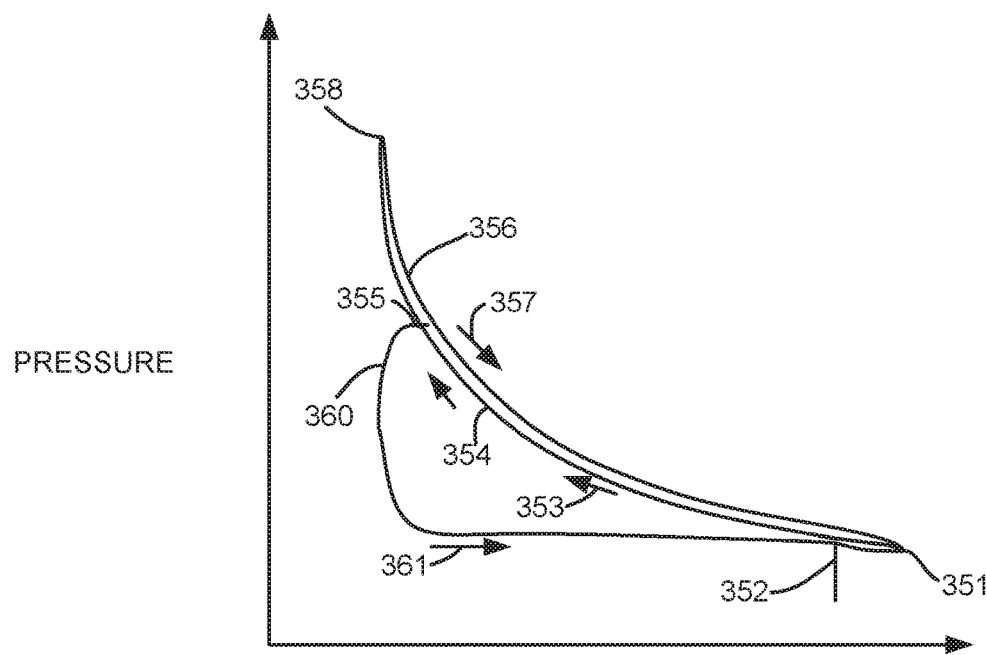
FIG. 3B is a plot showing an exemplary deactivated cylinder pumping cycle when intake valve timing is advanced from base timing.

The present description is related to controlling deactivated engine cylinders to improve engine operation. An engine that includes cylinders that may be selectively deactivated is shown in FIG. 1. FIGS. 2A and 2B show example configurations for the engine described in FIG. 1. FIG. 3A shows an example cylinder pumping cycle for a deactivated cylinder having base intake valve timing and exhaust valves that are held closed over the cylinder pumping cycle. FIG. 3B shows an example cylinder pumping cycle for a deactivated cylinder having advanced intake valve timing and exhaust valves that are held closed over the cylinder pumping cycle. A method for operating the engine of FIGS. 1-2B is shown in FIG. 4. In the context of this disclosure, a cylinder is activated when it is combusting air and fuel during an engine cycle (e.g., two engine revolutions for a four stroke engine). A cylinder is deactivated when it is not combusting air and fuel during an engine cycle. Further, in the context of this disclosure, an engine cylinder's exhaust stroke is always the engine cylinder's exhaust stroke whether or not the engine's exhaust valves are activated or deactivated. Likewise, other strokes of engine an engine cylinder remain their respective strokes even if intake and exhaust valves are deactivated.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Exhaust valve may be operated by a variable exhaust valve operator 53, which may be actuated mechanically, electrically, hydraulically, or by a combination of the same. For example, the exhaust valve actuators may be of the type described in U.S. Patent Publication 2014/0303873 and U.S. Pat. Nos. 6,321,704; 6,273,039; and 7,458,345, which are hereby fully incorporated for all intents and purposes. Exhaust valve 54 may be held closed during an entire engine cycle via variable exhaust valve operator 53. Further, exhaust valve operator may open exhaust 54 valves synchronously or asynchronously with crankshaft 40. The position of exhaust valve 54 may be determined by exhaust valve position sensor 57. Intake valve 52 is opened and closed via camshaft 51 which rotates at one half speed of crankshaft 40. Alternatively, intake valve 52 may be selectively operated via a variable valve operator.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. User interface 155, which may be referred to as a display or panel, allows vehicle occupants to request vehicle mode (e.g., economy/standard) and receive requests or diagnostic information from controller 12.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or vary slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle.

Each cylinder bank 202 and 204 includes a camshaft 51 for operating intake valves. Camshaft 51 may include cam lobes for each cylinder of an engine cylinder bank so that advancing intake cam timing for one engine cylinder of a cylinder bank advances intake valve timing for all engine cylinders on the cylinder bank. Further, each cylinder includes variable exhaust valve operators 53 for selectively opening and closing exhaust valves. An engine cylinder may be deactivated by ceasing fuel flow to the cylinder and holding its exhaust valves closed over an entire engine cycle as intake valves continue to open and close via intake camshaft 51. An engine cylinder may be activated by starting to open and close exhaust valves and intake valves during a cycle of the engine while fuel is delivered to the cylinder. Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine.

Referring now to FIG. 2B, an example multi-cylinder engine that includes one cylinder bank is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 250, which includes four cylinders 1-4. Cylinders of the single bank may be active or deactivated during a cycle of the engine. Cylinder bank 250 includes a camshaft 51 for operating intake valves. Camshaft 51 may include cam lobes for each cylinder of an engine cylinder bank so that advancing intake cam timing for one engine cylinder of a cylinder bank advances intake valve timing for all engine cylinders on the cylinder bank. Further, each cylinder includes variable exhaust valve operators 53 for selectively opening and closing exhaust valves. An engine cylinder may be deactivated by ceasing fuel flow to the cylinder and holding its exhaust valves closed over an entire engine cycle as intake valves continue to open and close via intake camshaft 51. The engine cylinder may be activated by starting to open and close exhaust valves and intake valves during a cycle of the engine while fuel is delivered to the cylinder.

The system of FIGS. 1-2B provides for an engine system, comprising: an engine including one or more cylinder exhaust valve deactivating mechanisms; a controller including executable instructions stored in non-transitory memory to deactivate exhaust valves of a cylinder in a closed position over an entire engine cycle via the one or more cylinder exhaust valve deactivation mechanisms, advance intake valve timing of the cylinder while the exhaust valves of the cylinder are deactivated in the closed position, and limit advance of intake valve timing in response to intake manifold pressure pulse amplitude. The engine system further comprises additional executable instructions to retard intake valve timing of the cylinder in response to a request to activate the cylinder. The engine system further comprises additional executable instructions to deactivate the cylinder via ceasing fuel delivery to the cylinder. The engine system further comprises additional instructions to advance intake valve timing of active engine cylinders while advancing intake valve timing of the cylinder. The engine system includes where the active engine cylinders are combusting air and fuel. The engine system includes where the engine further comprises a pressure sensor in an intake manifold of the engine.

Referring now to FIG. 3A, a plot of an exemplary cylinder pumping cycle for a deactivated cylinder with base intake valve timing is shown. The vertical axis represents cylinder pressure, or pressure in the cylinder, and cylinder pressure increases in the direction of the vertical axis arrow. The horizontal axis represents cylinder volume and cylinder volume increases in the direction of the horizontal axis arrow. The cylinder pumping cycle shown is not meant to be limiting, but are instead shown to illustrate the concepts described herein.

In this example cylinder pumping cycle, the cylinder is deactivated and exhaust valve of the cylinder are held in a closed position during the entire pumping cycle (e.g., two engine revolutions). Starting at 301, the piston (not shown) in the cylinder is at bottom-dead-center intake stroke (piston location of greatest cylinder volume) where the intake valves of the deactivated cylinder are open and the exhaust valves are closed. As the engine rotates the piston begins moving toward the cylinder head, thereby reducing cylinder volume. The intake valves are closed at 302 as the engine continues to rotate with the piston moving toward the cylinder head during the compression stroke. Cylinder pressure follows curve section 304 in the direction of arrow 303 while the cylinder is on its compression stroke and cylinder pressure increases in the compression stroke as the engine rotates and the piston moves toward the cylinder head. Cylinder pressure reaches a peak or highest value at top-dead-center compression stroke 308 and then begins to decrease as the piston moves away from top-dead-center compression stroke and into the expansion stroke along curve section 306. Cylinder pressure moves in the direction of arrow 307 during the expansion stroke. The piston approaches bottom-dead-center expansion stroke at 301 as the engine rotates. After passing bottom-dead-center expansion stroke, the cylinder enters the exhaust stroke and cylinder pressure again follows curve section 304 in the direction of arrow 303. The engine continues to rotate and move the piston toward top-dead-center exhaust stroke.

Shortly before the piston reaches top-dead-center exhaust stroke at 305, the intake valve opens causing pressure in the cylinder to be released into the engine intake manifold (not shown). The compressed air in the cylinder being released into the engine intake manifold causes a pressure pulse (e.g., pressure increase) in the engine intake manifold and pressure in the cylinder falls such that cylinder pressure follows curve section 310 in the direction of 311. The cylinder pressure reaches a minimal level and the cylinder volume reaches its maximum at bottom-dead-center intake stroke at 301. The cylinder pumping cycle repeats after the piston reaches bottom-dead-center intake stroke.

In this example, the intake valve opening time at 305 is a base intake valve timing where the intake valve opens near top-dead-center intake stroke where cylinder pressure is high due to the exhaust valves not opening in the cycle where the cylinder is deactivated. Because the intake valve opens late, increases in pressure occur within the engine intake manifold. These pressure increases may increase engine noise and vibration.

Referring now to FIG. 3B, a plot of a second exemplary cylinder pumping cycle for a deactivated cylinder with base intake valve timing is shown. The vertical axis represents cylinder pressure, or pressure in the cylinder, and cylinder pressure increases in the direction of the vertical axis arrow. The horizontal axis represents cylinder volume and cylinder volume increases in the direction of the horizontal axis arrow. The cylinder pumping cycle shown is not meant to be limiting, but are instead shown to illustrate the concepts described herein.

In this example cylinder pumping cycle, the cylinder is deactivated and exhaust valve of the cylinder are held in a closed position during the entire pumping cycle (e.g., two engine revolutions). Further, intake valve timing is advanced from the base intake valve timing shown in FIG. 3A. Starting at 351, the piston (not shown) in the cylinder is at bottom-dead-center intake stroke (piston location of greatest cylinder volume) where the intake valves of the deactivated cylinder are closed and the exhaust valves are closed. As the engine rotates the piston begins moving toward the cylinder head, thereby reducing cylinder volume and increasing pressure in the cylinder. In this example, the intake valves closed at 352, which is earlier (e.g., more advanced in time in the cylinder pumping cycle) than 302 of FIG. 3A. Cylinder pressure follows curve section 354 in the direction of arrow 353 while the cylinder is on its compression stroke and cylinder pressure increases in the compression stroke as the engine rotates and the piston moves toward the cylinder head. Cylinder pressure reaches a peak or highest value at top-dead-center compression stroke 358 and then begins to decrease as the piston moves away from top-dead-center compression stroke and into the expansion stroke along curve section 356. Cylinder pressure moves in the direction of arrow 357 during the expansion stroke. The piston approaches bottom-dead-center expansion stroke at 351 as the engine rotates. After passing bottom-dead-center expansion stroke, the cylinder enters the exhaust stroke and cylinder pressure again follows curve section 354 in the direction of arrow 353. The engine continues to rotate and move the piston toward top-dead-center exhaust stroke.

In this example, the intake valve timing is advanced as compared to the intake valve timing shown in FIG. 3A. Therefore, the intake valves open at 355 during the exhaust stroke, the intake valve opens causing pressure in the cylinder to be released into the engine intake manifold (not shown). However, since intake valve opening is advanced, pressure in the cylinder is lower. As a result, the compressed air in the cylinder being released into the engine intake manifold causes a smaller or reduced pressure pulse (e.g., pressure increase) in the engine intake manifold as compared to the cylinder pumping cycle shown in FIG. 3A. The pressure in the cylinder falls such that cylinder pressure follows curve section 360 in the direction of 361. The intake valves close at 352 and the cylinder volume continues to increase, thereby further reducing cylinder pressure until cylinder pressure reaches 351 (bottom-dead-center intake stroke). The cylinder pumping cycle repeats after the piston reaches bottom-dead-center intake stroke.

In this example, the intake valve opening time at 355 is advanced from the base intake valve timing shown in FIG. 3A. Because the intake valve opens early or advanced, the increase in pressure in the engine intake manifold may be reduced as compared to when intake valve timing is a base timing as shown in FIG. 3A for a same engine speed and engine torque output. Therefore, engine noise, vibration, and harshness may be reduced when intake valve timing of a deactivated engine cylinder is advanced from base intake valve timing.

Referring now to FIG. 4, a flow chart describing a method for operating an engine. The method may include advancing intake valve timing of deactivated cylinders while exhaust valves of the deactivated cylinders are held closed to prevent air flow through the cylinders to improve emissions system efficiency. The method of FIG. 4 may be incorporated into and may cooperate with the system of FIGS. 1-2B. Further, at least portions of the method of FIG. 4 may be incorporated as executable instructions stored in non-transitory memory while other portions of the method may be performed via a controller transforming operating states of devices and actuators in the physical world. The vehicle's engine is rotating and combusting air and fuel in at least one cylinder while method 400 is active.

At 402, method 400 determines vehicle operating conditions. Vehicle operating conditions may include but are not limited to engine speed, engine torque demand, engine temperature, vehicle operating mode (e.g., economy mode/standard mode etc.), suspension mode, and intake manifold pressure. Method 400 proceeds to 404.

At 404, method 400 judges if the engine is entering or is presently in a cylinder deactivation mode where one or more engine cylinders is deactivated and not combusting air and fuel. Further, cylinders are deactivated with exhaust valves held closed during one or more engine cycles (e.g., two revolutions for a four cycle engine). In one example, method 400 determines a value of a variable in controller memory and determines whether or not one or more engine cylinders is deactivated in response to the value. In other examples, method 400 may determine that one or more engine cylinders is deactivated in response to output of a sensor that indicates operating states of exhaust valve operators. Method 400 may enter or exit cylinder deactivation modes in response to vehicle operating conditions such as engine speed and engine torque. If method 400 judges that one or more engine cylinders is deactivated, the answer is yes and method 400 proceeds to 406. Otherwise, the answer is no and method 400 proceeds to 430.

At 430, method 400 judges if the engine is exiting a cylinder deactivation mode where one or more engine cylinders are deactivated to a mode where all engine cylinders are activated and combusting air and fuel. In one example, method 400 may compare a first value stored in memory to a second value stored in memory. The first value may indicate an engine cylinder mode from a last previous engine cycle and the second value may indicate an engine cylinder mode of the present engine cycle. If method 400 judges that the engine is exiting a cylinder mode with one or more deactivated cylinders and entering a cylinder mode where all engine cylinders are active, the answer is yes and method 400 proceeds to 432. Otherwise, the answer is no and method 400 proceeds to 434.

At 432, method 400 retards intake valve timing for activated cylinders, including previously deactivated cylinders and previously active cylinders, to a base intake valve timing. The base intake valve timing is an intake valve timing that is not based on engine cylinders being deactivated. Further, the base intake valve timing may be based on engine speed and requested engine torque. Since intake valve timing for active and deactivated engine cylinders is advanced as compared to base intake valve timing, intake valve timing of all engine cylinders is retarded in response to activating all engine cylinders such that intake valve timing is returned to base intake valve timing for the present engine speed and engine torque demand. Method 400 proceeds to exit after intake valve timing is adjusted.

At 434, method 400 operates intake valves at a base timing. The base timing may be output from empirically determined values stored in a table or function. The table or function is indexed via engine speed and requested torque. The table or function outputs intake valve timing in response to the engine speed and demanded engine torque. Method 400 proceeds to exit after intake valve timing is adjusted to base intake valve timing.

At 406, method 400 deactivates select engine cylinders in response to vehicle operating conditions including engine speed and requested engine torque. The requested engine torque may be determined from a requested wheel torque. The select cylinders are deactivated via ceasing fuel delivery to the cylinders being deactivated. In addition, exhaust valves of the deactivated engine cylinders are held in a closed state over one or more engine cycles. By holding the exhaust valves closed, excess air is prevented from reaching the exhaust gas after treatment system so that catalyst efficiency may be maintained. The intake valves of deactivated engine cylinders continue to open and close during each engine cycle.

Thus, a portion of engine cylinders may be deactivated as described previously while a remaining portion of engine cylinders continue to be active combusting air and fuel to provide engine torque to the vehicle driveline. Intake valves of all cylinders may continue to open and close each engine cycle whether or not some cylinders may be deactivated. In addition, the pattern and firing fraction of active cylinders may change each engine cycle or over the course of several engine cycles. Method 400 proceeds to 408.

At 408, method 400 judges if the vehicle is in an economy mode or a base mode. In one example, the vehicle may be judged to be in economy mode or base mode based on one or more values of variables stored in controller memory. A human driver or vehicle occupant may select economy or base mode via an interface counsel or panel. If method 400 judges that the vehicle is in an economy mode, the answer is yes and method 400 proceeds to 410. Otherwise, if the vehicle is not in economy mode, the answer is no and method 400 proceeds to 420.

At 410, method 400 advances intake valve timing by a second amount in response to deactivating one or more engine cylinders. The second amount may be more advanced than the first amount described at 420. By advancing intake valve timing further in economy mode, volumetric efficiency of active cylinders may be increased and amplitude of pressure pulsations in the engine intake manifold may be reduced. In addition, method 400 may also advance intake valve timing in response to the actual total number of active engine cylinders. In one example, the second amount is an empirically determined amount that provides a reduction in the amplitudes of intake manifold pressure pulsations that are from intake valve openings of deactivated engine cylinders and an increase in volumetric efficiency of active cylinders. Further, method 400 may increase intake valve timing advance by a third amount responsive to an actual total number of active cylinders being greater than a threshold amount. Method 400 may increase intake valve timing advance by a fourth amount responsive to the actual total number of active cylinders being less than the threshold amount. The third amount greater may be than the fourth amount. By providing less advance of intake valve timing when a fewer engine cylinders are active, the engine may provide improved torque response if a vehicle driver requests additional torque since intake valve timing does not have to be retarded as far to reach base intake valve timing. Thus, all engine cylinders may be reactivated with a higher capacity to provide torque sooner than if cylinders were reactivated when intake valve timing is further advanced. Method 400 proceeds to 412.

At 412, method 400 judges if amplitude of intake pressure pulses is less than a first threshold amount. The first threshold amount may vary (e.g., increase or decrease) with engine speed and driver demand torque. If method 400 judges that amplitude of one or more intake pressure pulses is less than a first threshold, the answer is yes and method 400 proceeds to 416. If method 400 judges that amplitude of the one or more intake pressure pulses is not less than the first threshold, method 400 proceeds to 414. If the amplitude of the one or more intake pressure pulses is not less than the first threshold, it may be determined that engine noise and/or vibration is greater than is desired.

At 414, method 400 advances intake valve timing until the amplitude of the one or more intake pressure pulses is less than the first threshold amount. The amplitude may be determined via a MAP sensor. Advancing intake valve timing of deactivated cylinders may reduce amplitudes of pressure pulsations in the intake manifold that are due to opening intake valves of deactivated engine cylinders. Further, intake valve timing of active cylinders may be advanced as intake valve timing of deactivated engine cylinders is advanced since a single cam of a cylinder bank may control intake valve timing of active and deactivated cylinders. However, if intake valve timing of active engine cylinders may be adjusted independently of intake valve timing of deactivated engine cylinders, then intake valve timing of only deactivated engine cylinders may be advanced in response to the intake pressure pulses that are related to opening of deactivated cylinder intake valves. During such conditions, intake valve timing of active cylinders may be maintained at a base timing. Method 400 proceeds to exit after advancing intake valve timing.

At 416, method 400 may retard intake valve timing of deactivated cylinders if the amplitude of the one or more intake pressure pulses is less than the second threshold amount, the second threshold amount less than the first threshold amount. By retarding intake valve timing toward base intake valve timing, it may be possible to improve engine torque response during conditions when an increase of engine torque is requested. Thus, method 400 may control amplitudes of intake manifold pressure pulses to a level between the first threshold and the second threshold. Retarding the intake valve timing increases the amplitude or pressure pulsations in the engine intake manifold. In this way, engine noise and vibration may be reduced while the engine retains capacity to provide a desired torque response. Method 400 proceeds to exit.

At 420, method 400 advances intake valve timing by a first amount in response to deactivating one or more engine cylinders. The first amount may provide less intake valve timing advance than the second amount described at 410; however, providing less intake valve timing advance (e.g., intake valve opening timing advance) may improve engine torque response. In addition, method 400 may also advance intake valve timing in response to the actual total number of active engine cylinders. In one example, the first amount is an empirically determined amount that provides a less significant reduction in the amplitudes of intake manifold pressure pulsations that are from intake valve openings of deactivated engine cylinders. Further, method 400 may increase intake valve timing advance by a third amount responsive to an actual total number of active cylinders being greater than a threshold amount. Method 400 may increase intake valve timing advance by a fourth amount responsive to the actual total number of active cylinders being less than the threshold amount. The third amount greater may be than the fourth amount. By providing less of an increase of intake valve timing when a fewer engine cylinders are active, the engine may provide improved torque response if a vehicle driver requests additional torque since intake valve timing does not have to be retarded as far to reach base intake valve timing. Thus, all engine cylinders may be reactivated with a higher capacity to provide torque sooner than if cylinders were reactivated when intake valve timing is further advanced. Method 400 proceeds to 412.

In this way, intake valve timing may be advanced to reduce intake manifold pressure pulsations, thereby reducing engine noise and vibration. Further, intake valve timing may be adjusted for the actual total number of active engine cylinders so that engine torque response may be improved.

Thus, the method of FIG. 4 provides for an engine method, comprising: holding exhaust valves of a cylinder of an engine closed and operating intake valves of the cylinder while rotating the engine through an engine cycle; and advancing intake valve timing of the cylinder while rotating the engine through the engine cycle. The method of claim 1, where operating intake valves includes opening and closing intake valves. The method further comprises advancing the intake valve timing from a base intake valve timing of the cylinder while operating the engine at a speed and torque output. The method further comprises operating the cylinder with the base intake valve timing when all cylinders of the engine are activated and the engine is operating at the speed and torque output. The method includes where the exhaust valves of the cylinder are held closed via a controller, and where advancing intake valve timing of the cylinder is performed via the controller. The method further comprises advancing intake valve timing to a first timing in response to a vehicle being in an economy mode and advancing intake valve timing to a second timing in response to the vehicle being in a mode other than the economy mode. The method further comprises retarding intake valve timing in further response to an amplitude of an intake pressure pulse produced via the cylinder.

The method of FIG. 4 also provides for an engine method, comprising: deactivating an engine cylinder and holding exhaust valves of the engine cylinder closed over an entire engine cycle while intake valves of the cylinder open and close in response to engine operating conditions; and advancing intake valve timing of the engine cylinder while the engine cylinder is deactivated, the intake valve timing advanced until an amplitude of an intake manifold pressure pulse is less than a threshold. The method further comprises advancing intake timing of activated engine cylinders while advancing intake valve timing of the engine cylinder. The method includes where deactivating the engine cylinder includes ceasing to flow fuel to the engine cylinder. The method further comprises retarding intake valve timing in response to reactivating the engine cylinder.

In some examples, the method further comprises advancing intake valve timing of the engine cylinder in response to a first timing when a vehicle is in an economy mode and advancing intake valve timing of the engine cylinder in response to a second timing when the vehicle is not in an economy mode. The method includes where the engine cylinder is included in an engine; and further comprising: advancing intake valve timing of active cylinders of the engine while advancing intake timing of the engine cylinder while the engine cylinder is deactivated. The method includes where the engine cylinder is included in an engine; and further comprising: opening an intake throttle of the engine while advancing intake valve timing of the engine cylinder while the engine cylinder is deactivated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine method, comprising:
    holding exhaust valves of a cylinder of an engine closed and operating intake valves of the cylinder while rotating the engine through an engine cycle; and
    advancing intake valve timing of the cylinder while rotating the engine through the engine cycle.

2. The method of claim 1, where operating intake valves includes opening and closing intake valves.

3. The method of claim 1, further comprising advancing the intake valve timing from a base intake valve timing of the cylinder while operating the engine at a speed and torque output.

4. The method of claim 3, further comprising operating the cylinder with the base intake valve timing when all cylinders of the engine are activated and the engine is operating at the speed and torque output.

5. The method of claim 1, where the exhaust valves of the cylinder are held closed via a controller, and where advancing intake valve timing of the cylinder is performed via the controller.

6. The method of claim 1, further comprising advancing intake valve timing to a first timing in response to a vehicle being in an economy mode and advancing intake valve timing to a second timing in response to the vehicle being in a mode other than the economy mode.

7. The method of claim 1, further comprising retarding intake valve timing in further response to an amplitude of an intake pressure pulse produced via the cylinder.

8. An engine method, comprising:
deactivating an engine cylinder and holding exhaust valves of the engine cylinder closed over an entire engine cycle while intake valves of the engine cylinder open and close in response to engine operating conditions; and
advancing intake valve timing of the engine cylinder while the engine cylinder is deactivated, the intake valve timing is advanced until an amplitude of an intake manifold pressure pulse is less than a threshold.

9. The method of claim 8, further comprising advancing intake timing of activated engine cylinders while advancing intake valve timing of the deactivated engine cylinder.

10. The method of claim 8, where deactivating the engine cylinder includes ceasing to flow fuel to the engine cylinder.

11. The method of claim 8, further comprising retarding intake valve timing in response to reactivating the engine cylinder.

12. The method of claim 8, further comprising advancing intake valve timing of the engine cylinder to a first timing when a vehicle is in an economy mode and advancing intake valve timing of the engine cylinder to a second timing when the vehicle is not in an economy mode.

13. The method of claim 8, where the engine cylinder is included in an engine; and further comprising:
advancing intake valve timing of active cylinders of the engine while advancing intake timing of the engine cylinder while the engine cylinder is deactivated.

14. The method of claim 8, where the engine cylinder is included in an engine; and further comprising:
opening an intake throttle of the engine while advancing intake valve timing of the engine cylinder while the engine cylinder is deactivated.

15. An engine system, comprising:
an engine;
a controller including executable instructions stored in non-transitory memory to deactivate exhaust valves of a cylinder in a closed position over an entire engine cycle, advance intake valve timing of the cylinder while the exhaust valves of the cylinder are deactivated in the closed position, and limit advance of intake valve timing in response to intake manifold pressure pulse amplitude.

16. The engine system of claim 15, further comprising additional executable instructions to retard intake valve timing of the cylinder in response to a request to activate the cylinder.

17. The engine system of claim 15, further comprising additional executable instructions to deactivate the cylinder via ceasing fuel delivery to the cylinder.

18. The engine system of claim 15, further comprising additional instructions to advance intake valve timing of active engine cylinders while advancing intake valve timing of the deactivated cylinder.

19. The engine system of claim 18, where the active engine cylinders are combusting air and fuel.

20. The engine system of claim 15, where the engine further comprises a pressure sensor in an intake manifold of the engine.

* * * * *